(12) United States Patent
Beers et al.

(10) Patent No.: US 10,160,546 B2
(45) Date of Patent: Dec. 25, 2018

(54) AIR CYCLE MACHINE WITH COOLING AIR FLOW PATH

(71) Applicant: Hamilton Sundstrand Corporation, Windsor Locks, CT (US)

(72) Inventors: Craig M. Beers, Wethersfield, CT (US); Christopher McAuliffe, Windsor, CT (US)

(73) Assignee: HAMILTON SUNDSTRAND CORPORATION, Windsor Locks, CT (US)

( * ) Notice: Subject to any disclaimer, the term of this patent is extended or adjusted under 35 U.S.C. 154(b) by 532 days.

(21) Appl. No.: 14/663,639

(22) Filed: Mar. 20, 2015

(65) Prior Publication Data
US 2016/0272329 A1    Sep. 22, 2016

(51) Int. Cl.
| | | |
|---|---|---|
| F25B 9/00 | (2006.01) | |
| B64D 13/06 | (2006.01) | |
| F01D 25/12 | (2006.01) | |
| F01D 25/16 | (2006.01) | |
| F02C 6/08 | (2006.01) | |
| F01D 25/18 | (2006.01) | |
| F01D 25/22 | (2006.01) | |

(Continued)

(52) U.S. Cl.
CPC ............. *B64D 13/06* (2013.01); *B64D 13/08* (2013.01); *F01D 25/125* (2013.01); *F01D 25/16* (2013.01); *F01D 25/186* (2013.01); *F01D 25/22* (2013.01); *F02C 6/08* (2013.01); *F02C 7/32* (2013.01); *F04D 29/057* (2013.01); *F04D 29/584* (2013.01); *B64D 2013/0618* (2013.01); *B64D 2013/0648* (2013.01); *Y02T 50/56* (2013.01); *Y02T 50/675* (2013.01)

(58) Field of Classification Search
CPC ................... B64D 13/06; B64D 13/08; B64D 2013/0618; B64D 2013/0648; F01D 25/125; F01D 29/584
See application file for complete search history.

(56) References Cited

U.S. PATENT DOCUMENTS 5,113,670 A * 5/1992 McAuliffe ............ F01D 25/125
                                                   417/406
5,309,735 A    5/1994 Maher, Jr. et al.
(Continued)

FOREIGN PATENT DOCUMENTS

EP    0547279 A1    6/1993
EP    2602191 A1    6/2013
(Continued)

OTHER PUBLICATIONS

Search Report regarding related EP App. No. 16161463.1; dated Jul. 27, 2016; 9 pgs.

*Primary Examiner* — Elizabeth Martin
(74) *Attorney, Agent, or Firm* — Cantor Colburn LLP

(57) ABSTRACT

An air cycle machine comprises rotating components that include a fan, a compressor, and a first turbine. The air cycle machine also includes a cooling airflow path that receives cooling air from a cooling air source, directs the cooling air to an air-cooled bearing for at least one of the rotating components, and discharges the cooling air. The airflow path is isolated from an inlet of the compressor by a seal member, and the airflow path is configured to maintain pressure at the seal member above a pressure at the compressor inlet.

12 Claims, 4 Drawing Sheets

(51) Int. Cl.
*B64D 13/08* (2006.01)
*F02C 7/32* (2006.01)
*F04D 29/58* (2006.01)
*F04D 29/057* (2006.01)

(56) References Cited

U.S. PATENT DOCUMENTS

| | | | |
|---|---|---|---|
| 2004/0016226 A1* | 1/2004 | Lawlor | F02C 3/085 60/39.35 |
| 2014/0321978 A1 | 10/2014 | Beers et al. | |
| 2015/0176501 A1* | 6/2015 | Mackin | F02C 6/08 415/1 |
| 2016/0138650 A1* | 5/2016 | McAuliffe | B64D 13/06 384/103 |

FOREIGN PATENT DOCUMENTS

| | | |
|---|---|---|
| EP | 2620616 A2 | 7/2013 |
| EP | 3020637 A1 | 5/2016 |

\* cited by examiner

AIR CYCLE MACHINE WITH COOLING AIR FLOW PATH

BACKGROUND OF THE INVENTION

The subject matter disclosed herein relates to an air cycle machine and, more particularly, to a cooling air supply control system for an air cycle machine.

Conventional aircraft environmental control systems (ECS) incorporate an air cycle machine, also referred to as an air cycle cooling machine, for use in cooling and dehumidifying air for an aircraft cabin. Such air cycle machines may include two or more wheels disposed at axially spaced intervals along a common shaft. The wheels are part of, for example, a compressor rotor, a turbine rotor, a fan rotor, an additional turbine rotor, or an additional compressor rotor. In some cases the turbine or turbines drive both the compressor and the fan.

Hydrodynamic fluid film journal bearings, also called journal air bearings or foil bearings, can be used to provide support to rotatable components such as shafts. A typical journal bearing may include a journal sleeve, a bump foil, an intermediate foil, and a top foil. During operation, rotation of the rotatable component causes a working fluid to form a cushion (often referred to as an "air bearing") that supports the rotatable component with little or no direct contact between the rotatable component and the foils of the bearing. Journal bearings provide fluid cushions for radial loads.

Similarly, hydrodynamic fluid film thrust bearings generate a lubricating non-linear air film between a portion of a rotating shaft or other rotatable component and the bearing. One typical bearing arrangement utilizes welded subassemblies. A top subassembly includes an annular main plate having multiple arcuate, corrugated foils welded to the main plate. A corresponding number of arcuate top foils are supported by bump foils. A bottom subassembly includes another annular main plate having multiple arcuate bump foils welded to the main plate. Thus, during operation, rotation of the rotatable component or shaft causes a working fluid to form in and around the corrugated foils to provide an air bearing. The bump foils provide a desired spring rate to cushion the rotatable component as the shaft moves axially. Thus, thrust bearings provide fluid cushions for axial loads.

During operation, the bearings may be rotated at speeds that result in heat generation. The heat can lead to failure of the bearings by compromising the structural integrity of the components of the bearings. To reduce the risk of failure of the bearings, cooling air is conveyed and passed over bearing surfaces to remove the heat from the bearing. The bearing cooling airflow is supplied from a single high pressure, cool temperature source such as the turbine inlet of the air conditioning system. Check valves and seals are commonly used to close the cooling air inlet to close the bearing cooling circuit in order to reduce leakage and impact system efficiency when the air cycle machine is not running, effectively shutting off the cooling air supply when not in use. However, such components are susceptible to leaks. A significant amount of energy is required to provide air in the air conditioning system that is used as cooling air, so any leaks from the cooling air circuit will cause an undesirable loss of efficiency.

BRIEF DESCRIPTION OF THE INVENTION

According to some aspects of the invention, an air cycle machine comprises rotating components that include a fan, a compressor, and a first turbine. The air cycle machine also includes a cooling airflow path that receives cooling air from a cooling air source, directs the cooling air to an air-cooled bearing for at least one of the rotating components, and discharges the cooling air. The airflow path is isolated from an inlet of the compressor by a seal member, and the airflow path is configured to maintain pressure at the seal member above a pressure at the compressor inlet.

In some aspects of the invention, a method of cooling bearings on rotating components of an air cycle machine including a fan, a compressor, and a first turbine comprises introducing air from a cooling air source to a cooling airflow path. The cooling air flows along the airflow path to the bearings on at least one of the rotating components. The cooling air flows along the airflow path past a seal member that isolates the airflow path from an inlet of the compressor, and the pressure of the airflow path at the seal member is at a pressure above the pressure at the inlet of the compressor. At the terminus of the airflow path, the cooling air is discharged.

These and other features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
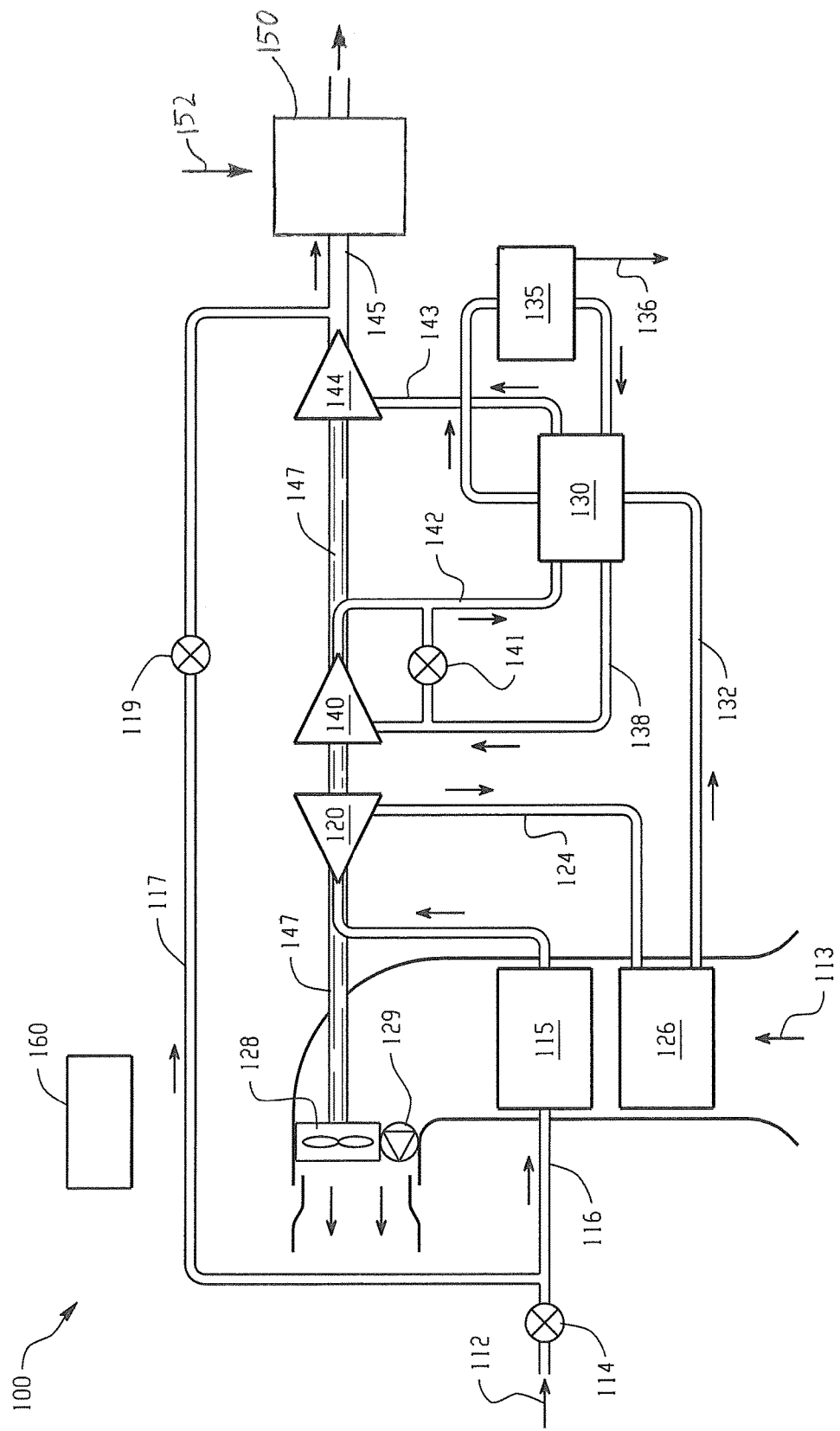
FIG. 1 is a schematic depiction of an exemplary air cycle machine.

Referring now to the Figures, FIG. 1 schematically depicts an exemplary air cycle machine. As shown in FIG. 1, an environmental air conditioning system 100 compressed air 112 from a compressed air source (not shown) such as a turbine engine bleed, an APU bleed, or an electrically-powered compressor is delivered through control valve 114 to pre-heat exchanger 114, where it is cooled to a temperature suitable for delivery to a ECS pack that is typically located in the wing of the aircraft near the fuselage. From there, the compressed air is directed to a heat exchanger 115 (also referred to in the art as a primary heat exchanger) where it rejects heat to ambient air flowing through or across a heat absorption side of heat exchanger 115. Cooled compressed air is discharged from heat exchanger 115 to compressor 120. A portion of the air going to heat exchanger 115 can be controllably diverted through conduit 117 and control/expansion valve 119 to mix with the outlet of turbine 144 and control the temperature of conditioned air 148. Compressor 120 compresses its portion of the air from the heat exchanger 115, which also results in heating of the air.

The further compressed air is discharged from compressor 120 through conduit 124 to heat exchanger 126 (also referred to in the art as a secondary heat exchanger) where it rejects heat to ambient air flowing through or across a heat absorption side of heat exchanger 126.

The ambient air 113 flowing through or across the heat absorption sides of heat exchangers 115 and 126 can be a ram air flow from a forward-facing surface of the aircraft. In conditions under which insufficient airflow is generated by the forward motion of the aircraft for operation of the heat exchangers 115, 126, the air flow can be assisted by operation of fan 128. Check/bypass valve 129 allows for bypass of the fan 128 when ram air flow is sufficient for the needs of the heat exchangers 115 and 126. Heat exchangers 115, 126 can share a flow path for the ambient cooling air, and can be integrated into a single unit with heat exchanger 115 sometimes referred to as a primary heat exchanger and heat exchanger 126 sometimes referred to as a secondary heat exchanger. Cooled air discharged from heat exchanger 126 is delivered through conduit 132 to a heat rejection side of heat exchanger 130. In the heat rejection side of heat exchanger 130, the air is further cooled to a temperature at or below the dew point of the air and flows into water removal unit 135 where liquid water 136 condensed from the air is removed. The dehumidified air flows through a heat absorption side of heat exchanger 130 where it is re-heated before being delivered through conduit 138 to turbine 140, where work is extracted as the air is expanded and cooled by turbine 140. A portion of the air going to turbine 140 can be diverted by valve 141 if needed to allow the temperature of the air at the inlet to the heat absorption side of heat exchanger 130 to be above freezing. The cooled expanded air discharged from the turbine 140 is delivered through conduit 142 to a heat absorption side of heat exchanger 130 where it along with the dehumidified air discharged from water collection unit 135 provides cooling needed to condense water vapor from air on the heat rejection side of heat exchanger 130. The air streams on the heat absorption side of the heat exchanger 130 are thus reheated. Heat exchanger 130 is also sometimes referred to as a condenser/reheater, and can be integrated with water removal unit 135 in a single unit. The reheated air from conduit 142 exiting from the heat absorption side of heat exchanger 130 flows through conduit 143 to turbine 144, where it is expanded and cooled, and then discharged from the system 100 through conduit 145 to mix manifold 150 where it is mixed with cabin air 152 before being discharged to the aircraft cabin. The environment air conditioning system 100 also includes a power transfer path 147 such as a rotating shaft that transfers power to the compressor 120 and fan 128 from work extracted by turbines 140 and 144.

Figure 2:
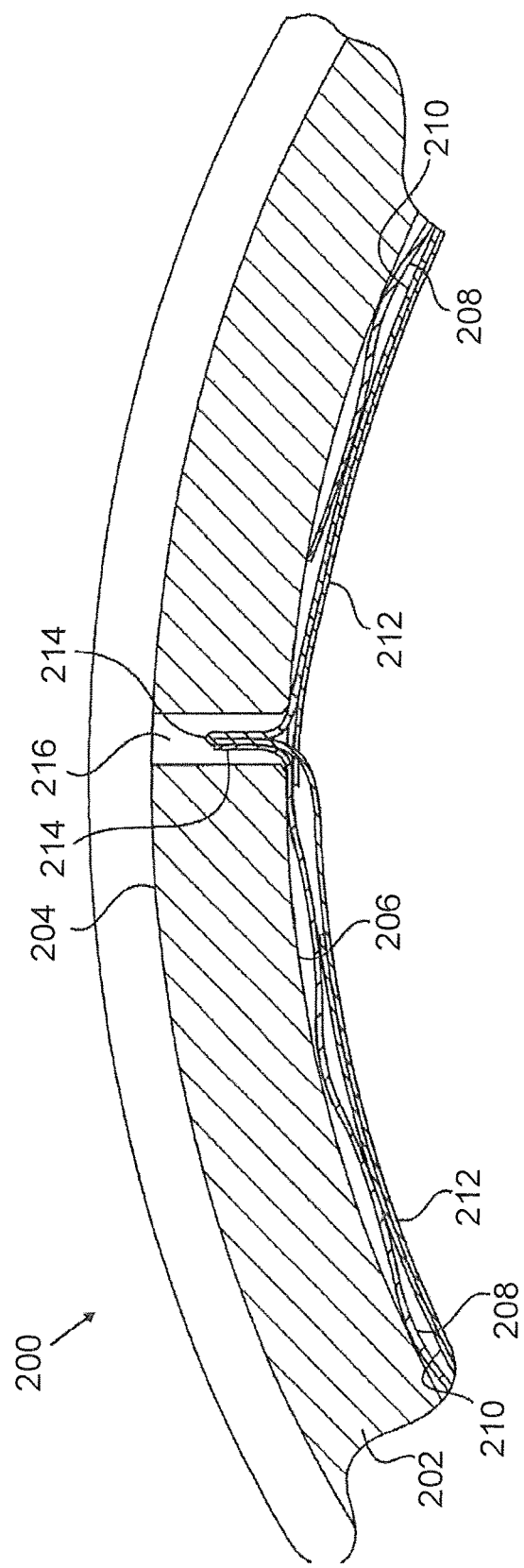
FIG. 2 is a partial cross-sectional view of an exemplary journal bearing.

FIG. 2 is a cross-sectional view of an exemplary hydrodynamic fluid film journal bearing assembly ("journal bearing 200"), which represents one type of foil hydrodynamic bearing that may employ embodiments of the invention. The journal bearing 200 includes a journal sleeve 202 that defines an outer diameter surface 204 and an inner diameter surface 206. The journal sleeve 202 is substantially cylindrical and is arranged about a central axis. It should be noted that the journal sleeve can have a conventional cylindrical shape, or can be shaped with a weight-reduced profile, or configured as other shapes or configurations, and FIG. 2 merely presents an exemplary configuration of a journal bearing 200.

In FIG. 2, a number of foils are arranged inside the journal sleeve 202. The journal bearing 200 includes a bump foil 208, an intermediate foil 210, and a top foil 222. The bump foil 208, the intermediate foil 210, and the top foil 212 are each formed from thin sheets of material (e.g., nickel-based alloys, steel, or similar materials) wrapped in a generally cylindrical shape and positioned in a bore of the journal sleeve 202. The bump foil 208 is corrugated, allowing a working fluid and/or cooling fluid to flow through the spaces formed between adjacent corrugations. The bump foil 208 is positioned adjacent to the inner diameter surface 206 of the journal sleeve 202. The foils 208, 210, and 212 are retained relative to the journal sleeve 102 with bent portions 214 that engage a key slot 216.

A rotatable component like a shaft (not shown) can be positioned inside the journal bearing 200, radially inward from the top foil 212. A radially inner surface of the top foil 212 exposed to the rotatable component can optionally be coated with a suitable dry film lubricant. Use of such a dry film lubricant can reduce friction caused by the rotatable component contacting the top foil 212 when accelerating to operating speed, when decelerating from operating speed, when stopped, and when subject to incidental contact with the top foil 222 during regular operation. Even with the application of a dry film lubricant, during operation heat is generated on the surfaces of the foils 208, 210, and 212 of journal bearing 200, which can lead to structural failure of the journal bearing 200. Accordingly, moving air is passed over the surfaces of the journal bearing 200 to remove the heat and prevent the journal bearing 200 from overheating and failing. However, under atypical system operation, loads exceeding bearing capacity will be imposed on a bearing leading to an associated increase in bearing cooling flow temperature and bearing failure.

Figure 3:
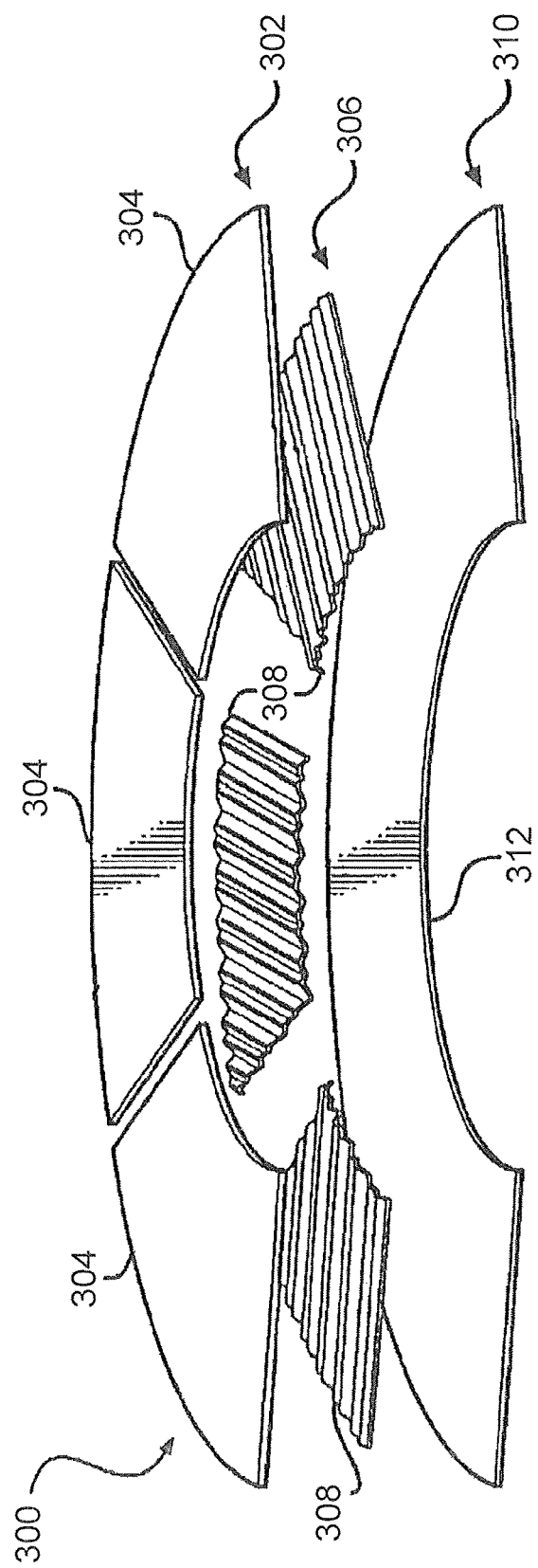
FIG. 3 is a partial exploded view of an exemplary thrust bearing.

Now referring to FIG. 3, an exploded view of an exemplary hydrodynamic fluid film thrust bearing assembly ("thrust bearing 300"), which represents another type of foil hydrodynamic bearing that may employ embodiments of the invention, is shown. The thrust bearing 300 of FIG. 3 has a different construction than the journal bearing 200 of FIG. 2. This is because journal bearings, such as shown in FIG. 2, operate with radial loads, whereas thrust bearings, as shown in FIG. 3 operate with axial loads. However, both types of bearings operate similarly by employing hydrodynamic fluid films, such as air or other fluids, to both provide bearing lubricant and cooling flows to prevent overheating.

The thrust bearing 300 includes three layers, but may include more or fewer layers. A first layer 302 comprises multiple arcuate top foils 304 that are spaced circumferentially relative to one another about a central axis. The top foils 304 are supported by a second layer 306 having a corresponding number of arcuate bump foils 308 arranged circumferentially beneath the top foils 304. The bump foils 308 are corrugated to provide cushioning and accommodate a cooling airflow through the thrust bearing 300. A third layer 310 is provided as an annular main plate 312 that supports the bump foils 308. Similar to a journal bearing, the top foils 304 of the thrust bearing may be coated in a dry film lubricant. The three layers 302, 306, and 310 may be secured to one another, for example, by spot welding.

Similar to the journal bearing 200 of FIG. 2, moving air is passed over the surfaces of the thrust bearing 300 to remove the heat and prevent the thrust bearing 300 from overheating and failing. However, again, under atypical system operation, loads exceeding bearing capacity will be imposed on a bearing leading to an associated increase in bearing cooling flow temperatures and to bearing failure.

The above described hydrodynamic bearings can be employed in air cycle machines of aircraft. The hydrodynamic bearings provide a long lasting bearing with minimal to no required maintenance. This is because the bearings employ air as both a lubricating fluid and as a cooling fluid. This means that no lubricating or cooling liquids, such as oils, need to be replaced over time.

Figure 4:
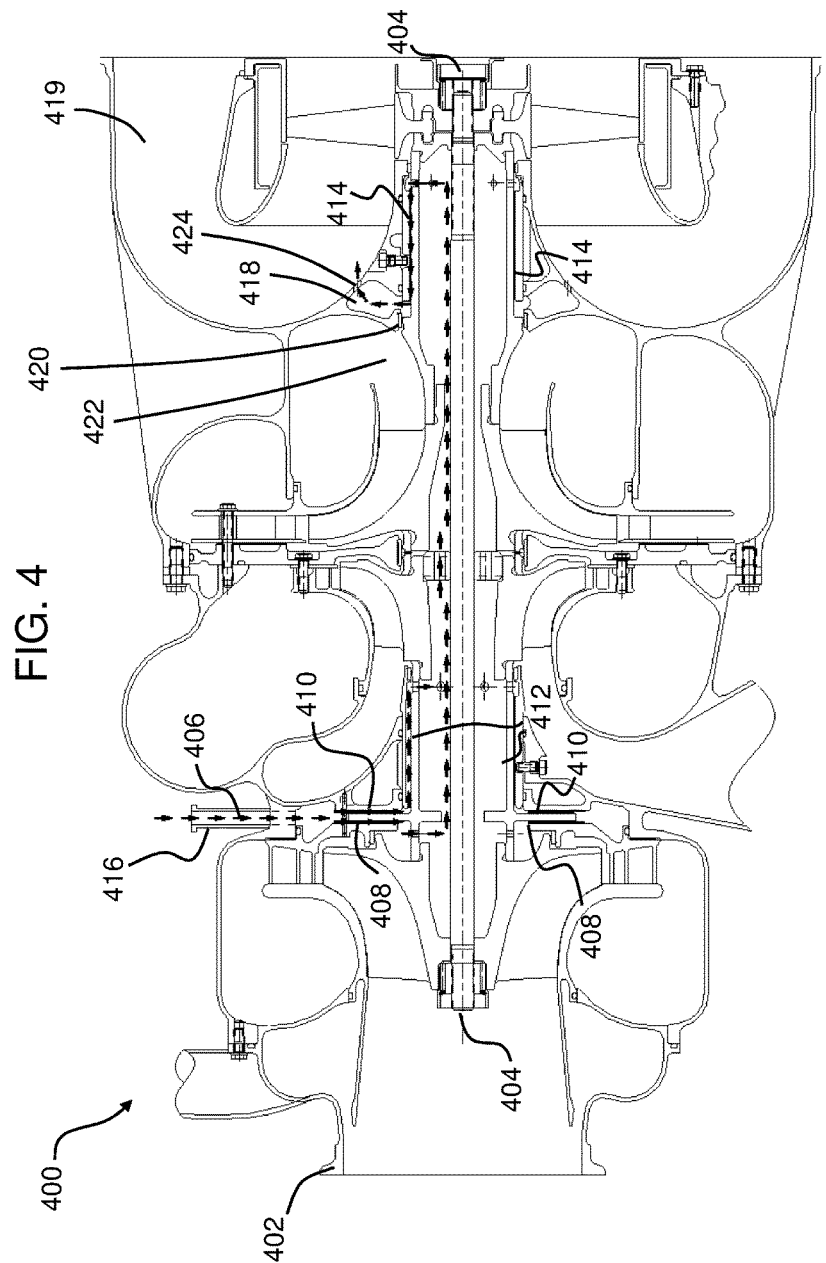
FIG. 4 is a schematic cross-sectional view of a cooling airflow path in an air cycle machine.

Turning now to FIG. 4, an air cycle machine 400 is part of an environmental control system that is configured to supply conditioned air, for example, to a cabin of an aircraft. The air cycle machine 400 is a four-wheel air cycle machine, with four rotors on a single shaft 404 analogous to the power transfer path 147 (FIG. 1). The four rotors are fixed together and are supported by bearing elements. Thus, there are four bearings configured within the air cycle machine 400 which are arranged along a cooling airflow path 406, represented by the path of arrows in FIG. 4. The airflow path 406 provides air as both a lubricating fluid for the hydrodynamic bearings and as a cooling air flow to remove heat generated by the bearings during operation. Although described herein as a four-wheel air cycle machine, this is presented for illustrative and explanatory purposes, and other air cycle machines or other device/configurations may be used without departing from the scope of the invention, such as, for example, three-wheel air cycle machines.

In the exemplary configuration of FIG. 4, two of the four bearings are thrust bearings and two are journal bearings. A first thrust bearing 408 is configured as an outboard thrust bearing and a second thrust bearing 410 is configured as an inboard thrust bearing. After the thrust bearings 408 and 410, in the direction of the airflow path 406, a first journal bearing 412 is configured as a turbine journal bearing and a second journal bearing 414 is configured as a fan journal bearing. The thrust bearings 408, 410 are configured to operate with axial loads, and the journal bearings 412, 414 are configured to operate with radial loads.

As a non-limiting example, the air cycle machine 400 may operate at 20,000-50,000 RPM. However, other rotational speeds of operation may be used without departing from the scope of the invention. As such, during operation, each of the bearings 408, 410, 412, 414 will generate heat due to viscous shear of the hydrodynamically generated film of air between the bearing top foil and the rotating shaft which can lead to structural failure of the bearings. To dissipate the heat, air flows along airflow path 406 and passes over the bearings 408, 410, 412, 414 to provide cooling through or over the bearings.

The cooling air then flows to chamber 418, from which it exits to ram air circuit 419 (analogous to ambient air 113, FIG. 1). A seal 420 such as a labyrinth seal separates and seals the chamber 418 from compressor inlet 422. With prior art bearing cooling airflow configurations, any leak at a seal between a compressor inlet and a cooling airflow path would result in a loss of high-energy ECS air from the compressor inlet. As shown in FIG. 4, however, an orifice 424 is disposed at the outlet of the airflow path 406 to the ram air circuit 419. The orifice is sized and positioned to maintain a pressure in the chamber 418 that is higher than the pressure at the compressor inlet 422. In this way, any leak at the seal 420 results not in a loss of high ECS air from the compressor inlet 422, but instead a leak at seal 420 results in cooling air from airflow path 406 being returned to the ECS system across a leaking seal 420 to the compressor inlet 422. In some exemplary embodiments, the pressure in the chamber 418 is maintained at a pressure from 0 psi to 5 psi above the pressure at the compressor inlet 422. In some exemplary embodiments, the pressure at the compressor inlet is from 0 psig to 8.5 psig, or 10.0 psia to 14.7 psia. In some exemplary embodiments, the pressure in the chamber 418 is from 0 psig to 13.5 psig (10.0 psia to 19.7 psia).

The cooling air is supplied from a cooling air inlet 416. Traditionally, the inlet 416 is fluidly connected to a single air supply source, which is usually a single, high pressure, cool temperature source (not shown). In some exemplary embodiments, the cooling air source is a turbine such as turbine 140 (FIG. 1), which in some embodiments is the cooling air source when the aircraft is on the ground. In some exemplary embodiments, the cooling air source is a compressor such as compressor 120 (FIG. 1), which in some embodiments is the cooling air source when the aircraft is at high altitude (e.g., above 10,000 feet).

While the invention has been described in detail in connection with only a limited number of embodiments, it should be readily understood that the invention is not limited to such disclosed embodiments. Rather, the invention can be modified to incorporate any number of variations, alterations, substitutions, combination, sub-combination, or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. An air cycle machine, comprising:
   rotating components including a fan, a compressor, and a first turbine; and
   an airflow path that receives cooling air from a cooling air source, directs the cooling air to an air-cooled bearing for at least one of said rotating components, and discharges the cooling air;
   wherein the airflow path is isolated from an inlet of the compressor by a seal member, and further wherein the airflow path terminates in a chamber that includes an outlet through an orifice that is configured to maintain pressure at the seal member above a pressure at the compressor inlet.

2. The air cycle machine of claim 1, wherein the pressure at the compressor inlet is from 0 psig to 8.5 psig (0 kPa to 58.6 kPa).

3. The air cycle machine of claim 1, wherein the pressure on the airflow path at the seal member is greater than the pressure at the at the compressor inlet by from 0 psi to 5 psi (0 kPa to 34.5 kPa).

4. The air cycle machine of claim 1, wherein the outlet is in fluid communication with a ram airflow circuit.

5. The air cycle machine of claim 1, wherein the airflow path is in fluid communication with a bearing on each of said fan, compressor, and turbine.

6. The air cycle machine of claim 1, further comprising a second turbine having a bearing on the airflow path.

7. The air cycle machine of claim 1 wherein the seal is a labyrinth seal.

8. The air cycle machine of supply controller of claim 1, wherein the airflow path is in fluid communication with a cooling air source selected from the turbine or the compressor.

9. The air cycle machine of claim 8, wherein the cooling air source is the turbine when the aircraft is on the ground and is the compressor when the aircraft is at high altitude.

10. A method of cooling bearings on rotating components of an air cycle machine including a fan, a compressor, and a first turbine, comprising
   introducing air from a cooling air source to a cooling airflow path;

flowing the cooling air along the airflow path to the bearings on at least one of the rotating components;

flowing the cooling air along the airflow path past a seal member that isolates the airflow path from an inlet of the compressor at a pressure above a pressure at the inlet of the compressor; and discharging the cooling air from the airflow path through an orifice in a chamber, said orifice configured to maintain the pressure at the seal member above a pressure at the compressor inlet.

11. The method of claim 10, wherein the pressure at the compressor inlet is from 0 psig to 8.5 psig (0 kPa to 58.6 kPa).

12. The method of claim 10, wherein the pressure on the airflow path at the seal member is greater than the pressure at the at the compressor inlet by from 0 psi to 5 psi (0 kPa to 34.5 kPa).

* * * * *